United States Patent
Wootton et al.

(10) Patent No.: US 11,245,285 B2
(45) Date of Patent: Feb. 8, 2022

(54) FACEPLATE SWITCH

(71) Applicant: Ivani, LLC, Dardenne Prairie, MO (US)

(72) Inventors: Matthew Wootton, O'Fallon, MO (US); Boris Dieseldorff, St. Charles, MO (US)

(73) Assignee: Ivani, LLC, Dardenne Prairie, MO (US)

( * ) Notice: Subject to any disclaimer, the term of this patent is extended or adjusted under 35 U.S.C. 154(b) by 0 days.

(21) Appl. No.: 15/909,744

(22) Filed: Mar. 1, 2018

(65) Prior Publication Data

US 2018/0188706 A1    Jul. 5, 2018

Related U.S. Application Data

(63) Continuation-in-part of application No. 15/449,172, filed on Mar. 3, 2017, now Pat. No. 10,072,942, and
(Continued)

(51) Int. Cl.
  *H02J 13/00*   (2006.01)
  *H02J 4/00*    (2006.01)
  (Continued)

(52) U.S. Cl.
  CPC ........ *H02J 13/00004* (2020.01); *G05B 15/02* (2013.01); *G05B 19/042* (2013.01);
  (Continued)

(58) Field of Classification Search
  CPC .............. G05B 15/02; G05B 19/0423; G05B 2219/25188; G05B 2219/2642; H02J 4/00;
  (Continued)

(56) References Cited

U.S. PATENT DOCUMENTS

| | | |
|---|---|---|
| 3,813,579 A | 5/1974 | Doyle et al. |
| 5,065,104 A | 11/1991 | Kusko et al. |
| | (Continued) | |

FOREIGN PATENT DOCUMENTS

| | | |
|---|---|---|
| CN | 1909755 A | 2/2007 |
| CN | 101184353 A | 5/2008 |
| | (Continued) | |

OTHER PUBLICATIONS

International Search Report, International Patent Application No. PCT/US2019/020784, dated Jun. 21, 2019 (14 pages).
(Continued)

*Primary Examiner* — Hal Kaplan
*Assistant Examiner* — Swarna N Chowdhuri
(74) *Attorney, Agent, or Firm* — Lewis Rice

(57) ABSTRACT

Devices, systems, and methods for modifying an existing electrical circuit to enable a conventional mechanical switch to integrate with and operate smart devices, while also providing continuous power supply and cooperating with external operation of the smart devices (e.g., via a mobile device application, smart controller, etc.). The smart device thus is operable both via the physical switch and via a home automation system, without loss of power to the smart device computer and transmitter components caused by use of the wall switch. This may be done via a replacement switch or faceplate which effectively bypasses the physical switch to ensure continuous power to the smart device while also inferring and transmitting the toggle state of the switch by measuring an amount of current through the faceplate.

25 Claims, 7 Drawing Sheets

Related U.S. Application Data a continuation-in-part of application No. 14/855,031, filed on Sep. 15, 2015, now Pat. No. 10,211,004, which is a continuation-in-part of application No. 14/698,690, filed on Apr. 28, 2015, now Pat. No. 9,843,194, which is a continuation-in-part of application No. 14/606,881, filed on Jan. 27, 2015, now Pat. No. 9,692,236.

(60) Provisional application No. 62/331,220, filed on May 3, 2016, provisional application No. 62/074,902, filed on Nov. 4, 2014, provisional application No. 61/932,085, filed on Jan. 27, 2014.

(51) Int. Cl.
    *G05B 19/042*      (2006.01)
    *G05B 15/02*      (2006.01)
    *H05B 39/02*      (2006.01)
    *H05B 47/19*      (2020.01)

(52) U.S. Cl.
    CPC ..... *G05B 19/0423* (2013.01); *G05B 19/0428* (2013.01); *H02J 4/00* (2013.01); *H02J 13/0017* (2013.01); *H05B 39/02* (2013.01); *H05B 47/19* (2020.01); *G05B 2219/25188* (2013.01); *G05B 2219/2642* (2013.01); *H01H 2300/03* (2013.01); *H01H 2300/032* (2013.01); *Y02A 30/60* (2018.01); *Y02B 20/40* (2013.01)

(58) Field of Classification Search
    CPC ................ H05B 37/0272; H05B 39/02; H01H 2300/032
    USPC ......................................................... 307/115
    See application file for complete search history.

(56) References Cited

U.S. PATENT DOCUMENTS

| | | | |
|---|---|---|---|
| 5,563,455 A | 10/1996 | Cheng | |
| 7,649,727 B2* | 1/2010 | Elberbaum | H01H 9/167 361/170 |
| 7,663,325 B2 | 2/2010 | McDonough et al. | |
| 8,193,929 B1 | 6/2012 | Siu et al. | |
| 8,269,376 B1* | 9/2012 | Elberbaum | H01H 9/167 307/115 |
| 8,531,134 B2 | 9/2013 | Chemel et al. | |
| 8,536,998 B1 | 9/2013 | Siu et al. | |
| 8,552,664 B2 | 10/2013 | Chemel et al. | |
| 8,593,264 B2 | 11/2013 | Umezawa et al. | |
| 8,766,556 B2 | 7/2014 | Meyer | |
| 8,849,471 B2 | 9/2014 | Daniel et al. | |
| 9,575,091 B2 | 2/2017 | Reeder, III | |
| 9,955,555 B2* | 4/2018 | Lark, Jr. | H05B 33/0803 |
| 2003/0090917 A1 | 5/2003 | Chan et al. | |
| 2004/0196140 A1 | 10/2004 | Sid | |
| 2006/0089117 A1 | 4/2006 | Suzuki | |
| 2006/0161270 A1 | 7/2006 | Luskin et al. | |
| 2007/0007826 A1* | 1/2007 | Mosebrook | H05B 37/0209 307/139 |
| 2008/0024074 A1 | 1/2008 | Mosebrook et al. | |
| 2009/0079416 A1* | 3/2009 | Vinden | G01R 22/06 324/103 R |
| 2009/0121842 A1* | 5/2009 | Elberbaum | G08C 17/02 340/10.5 |
| 2009/0174569 A1* | 7/2009 | Smith | H04L 12/2832 340/8.1 |
| 2009/0241283 A1* | 10/2009 | Loveless | A47L 7/0085 15/319 |
| 2009/0256483 A1 | 10/2009 | Gehman et al. | |
| 2009/0267632 A1 | 10/2009 | Rowe et al. | |
| 2010/0070217 A1 | 3/2010 | Shimada et al. | |
| 2010/0134051 A1* | 6/2010 | Huizenga | H05B 47/19 315/362 |
| 2010/0145545 A1* | 6/2010 | Mosebrook | H05B 39/08 700/297 |
| 2010/0278537 A1* | 11/2010 | Elberbaum | G08C 23/06 398/112 |
| 2010/0301775 A1* | 12/2010 | Bella | H05B 39/02 315/307 |
| 2011/0082599 A1 | 4/2011 | Shinde et al. | |
| 2011/0109301 A1* | 5/2011 | Johnson | G01R 1/22 324/119 |
| 2011/0121654 A1 | 5/2011 | Recker et al. | |
| 2011/0141647 A1 | 6/2011 | Garcia et al. | |
| 2011/0175553 A1 | 7/2011 | Sampsell | |
| 2011/0182012 A1* | 7/2011 | Hilton | H02G 3/14 361/679.01 |
| 2011/0304205 A1* | 12/2011 | Lee | G01R 21/133 307/31 |
| 2012/0046003 A1 | 2/2012 | Ying | |
| 2012/0049639 A1 | 3/2012 | Besore et al. | |
| 2012/0092060 A1 | 4/2012 | Ganesan | |
| 2012/0181865 A1 | 7/2012 | Muthu | |
| 2012/0207481 A1* | 8/2012 | Elberbaum | G08C 23/06 398/113 |
| 2012/0262006 A1* | 10/2012 | Elberbaum | H02G 3/12 307/112 |
| 2012/0280822 A1 | 11/2012 | Kuo | |
| 2013/0102264 A1 | 4/2013 | Nakane et al. | |
| 2013/0175863 A1 | 7/2013 | Pan | |
| 2013/0201316 A1 | 8/2013 | Binder et al. | |
| 2013/0320769 A1 | 12/2013 | Sawyers | |
| 2014/0005809 A1* | 1/2014 | Frei | H04L 29/1249 700/90 |
| 2014/0097758 A1 | 4/2014 | Recker et al. | |
| 2014/0105079 A1 | 4/2014 | Bengtsson et al. | |
| 2014/0117780 A1 | 5/2014 | Buchheim et al. | |
| 2014/0117871 A1 | 5/2014 | Swatsky et al. | |
| 2014/0169795 A1 | 6/2014 | Clough | |
| 2014/0211345 A1 | 7/2014 | Thompson et al. | |
| 2014/0214218 A1 | 7/2014 | Eldridge et al. | |
| 2014/0265881 A1 | 9/2014 | Karc et al. | |
| 2014/0266171 A1 | 9/2014 | Mosser et al. | |
| 2015/0005900 A1 | 1/2015 | Steele et al. | |
| 2015/0022181 A1 | 1/2015 | Anderson et al. | |
| 2015/0059086 A1 | 3/2015 | Clough | |
| 2015/0088331 A1 | 3/2015 | Fiedler et al. | |
| 2016/0126031 A1* | 5/2016 | Wootton | H02J 13/00 361/211 |
| 2017/0086281 A1 | 3/2017 | Avrahamy | |
| 2018/0070431 A1* | 3/2018 | Charlton | G08C 17/02 |

FOREIGN PATENT DOCUMENTS

| | | |
|---|---|---|
| CN | 201319687 Y | 9/2009 |
| CN | 201467534 U | 5/2010 |
| CN | 201639825 U | 11/2010 |
| CN | 201839492 U | 5/2011 |
| CN | 102131327 A | 7/2011 |
| CN | 202475882 U | 10/2012 |
| CN | 202738203 U | 2/2013 |
| CN | 202759621 U | 2/2013 |
| CN | 203241317 U | 10/2013 |
| CN | 203243557 U | 10/2013 |
| JP | 2005136532 A | 5/2005 |
| JP | 2006129098 A | 5/2006 |
| JP | 2007159370 A | 6/2007 |
| JP | 2008042998 A | 2/2008 |
| JP | 2008305800 A | 12/2008 |
| JP | 2011109784 A | 6/2011 |
| KR | 100887425 B1 | 3/2009 |
| KR | 100912039 B1 | 8/2009 |
| KR | 20090113941 A | 11/2009 |
| KR | 101009613 B1 | 1/2011 |
| KR | 20130012996 A | 2/2013 |
| KR | 20130017298 A | 2/2013 |
| KR | 20140080755 A | 7/2014 |
| KR | 20140120748 A | 10/2014 |
| WO | 2008035322 A1 | 3/2008 |

(56) References Cited

FOREIGN PATENT DOCUMENTS

| WO | 2011055199 A1 | 5/2011 |
|---|---|---|
| WO | 2011062445 A2 | 5/2011 |
| WO | 2012010170 A1 | 1/2012 |
| WO | 2014026226 A1 | 2/2014 |
| WO | 2014109486 A1 | 7/2014 |

OTHER PUBLICATIONS

Extended European Search Report, International Patent Application No. EP15857698, dated Jun. 5, 2018 (12 pages).
International Search Report, International Patent Application No. PCT/US2015/013127, dated Apr. 24, 2015 (10 pages).
International Search Report, International Patent Application No. PCT/US2015/058019, dated Feb. 5, 2016 (10 pages).
International Search Report, International Patent Application No. PCT/US2015/057869, dated Feb. 5, 2016, 10 pages.
International Search Report, International Patent Application No. PCT/US2017/030864, dated Jul. 28, 2017 (13 pages).
Supplementary European Search Report, European Application No. EP 15 74 0354.4, dated Sep. 20, 2017 (8 pages).
Supplementary European Search Report, European Application No. EP 15 85 7587.8, dated Sep. 20, 2017 (12 pages).
Using Encryption: Bluetooth Technology, http://www.brighthub.com/computing/smb-security/articles/106638.aspx, Feb. 15, 2011 (5 pages).

\* cited by examiner

FACEPLATE SWITCH

CROSS-REFERENCE TO RELATED APPLICATIONS

This application is a Continuation-in-Part of U.S. Utility patent application Ser. No. 14/855,031 filed Sep. 15, 2015. U.S. Utility patent application Ser. No. 14/855,031 is a Continuation-in-Part of U.S. Utility patent application Ser. No. 14/698,690 filed Apr. 28, 2015 and now issued as U.S. Pat. No. 9,843,194 and claims benefit of U.S. Prov. Pat. App. Nos. 62/074,902 filed Nov. 4, 2014. U.S. Utility patent application Ser. No. 14/698,690 is a Continuation-in-Part of U.S. Utility patent application Ser. No. 14/606,881 filed Jan. 27, 2015 and now issued as U.S. Pat. No. 9,692,236 and claims benefit of U.S. Prov. Pat. App. No. 62/074,902 filed Nov. 4, 2014. U.S. Utility patent application Ser. No. 14/606,881 claims benefit of U.S. Prov. Pat. App. No. 61/932,085 filed Jan. 27, 2014. This application is also a Continuation-in-Part of U.S. Utility patent application Ser. No. 15/449,172 filed Mar. 3, 2017, which claims benefit of U.S. Prov. Pat. App. No. 62/331,220 filed May 3, 2016. The entire disclosures of all of the foregoing documents is incorporated herein by reference.

BACKGROUND

1. Field of the Invention

This disclosure is related to the field of electrical wiring, and more particularly to systems, methods, and apparatus pertaining to an intelligent multi-way electric switch.

The era of home automation, sometimes also known as "domotics," has arrived and homeowners and property managers are increasingly turning to "smart home" devices. Despite the name, smart home technologies have applications that range beyond dwellings, as they facilitate the automation and control of common home operating systems such as electrical, lighting, heating, ventilation, air conditioning (HVAC), security, as well as integration with smart appliances, such as washers/dryers, ovens, dishwashers, refrigerators and freezers.

Generally, these technologies use the now almost-ubiquitous wireless local access network (WLAN) found in most homes in combination with the also widespread availability of wireless network-enabled mobile computers, such as tablet PCs and smart phones, to connect to and manage "smart devices." Obviously, participating smart home devices likewise comprise wireless transmitters for receiving instructions and transmitting status and other data, and computers for intelligent, programmatic management of the devices.

One common problem with implementing home automation, however, is that very few dwellings are constructed with home automation in mind. Even for new construction, homes are typically built in accordance with decades-old construction practices and using long-accepted conventional materials and components. Converting homes to use smart home devices is simple for certain types of home operating systems, but difficult for others.

For example, HVAC and security systems are typically operated via a main control, such as a thermostat or security panel. These main controls can simply be replaced with network-enabled smart device counterparts to enable home automation. This is easy to do even for an unskilled homeowner, as these remote panels usually operate on low-voltage circuits that pose little material risk to even the untrained homeowner, and have simpler configurations that can be easily transferred from an existing "dumb" device to a new smart device.

However, other home systems are more complicated. For example, electrical power enters a home usually through overhead or buried power lines. The home is connected to the power grid via a circuit breaker panel, which is usually located in a garage, basement, or electrical closet near the physical point where the power lines reach the dwelling. The circuit breaker then splits the incoming power into a plurality of different independent circuits, each of which is separately controllable at the panel by throwing a circuit breaker on or off.

Although certain high-load appliances may have dedicated circuits, typically an entire room or set of rooms with related functions are wired in parallel on a shared circuit. For example, an electric oven might receive its own circuit, but all lights and power outlets in a bedroom might all be wired together. This limits the degree of granularity by which circuits might be operable via the breaker. Moreover, unlike a low-voltage thermostat, most homeowners lack the knowledge, expertise, or equipment to safely alter a circuit breaker. Thus, implementing smart home technology in light and power fixtures is not practical at the breaker.

Instead, smart home technologies have focused on replacing individual power and light receptacles, a task which can be performed safely by a careful homeowner even if unskilled. However, this approach has certain inherent limitations and drawbacks, in that power may not always be available in certain applications, and such replacements generally do not integrate smoothly with conventional hardware.

This may be best understood through an example. Prior art FIGS. 1A, 1B, and 1C depict a simple conventional light switch wiring geometry. As seen in FIGS. 1A and 1B, a live power line (103) runs from the circuit breaker (or other equivalent power source) to a conventional switch (107) (here shown as a single-pole, single-throw, or SPST switch), and from there to a load (108), shown here at a light receptacle. A neutral line (105) runs from the load (108) back to the power source, thereby completing the circuit. FIG. 1A depicts both a schematic and electric diagram of such a circuit in which the switch (107) is in off position. In this position, the circuit is broken by the switch, no current flows through the wires, and the load (108) is unpowered. FIG. 1B shows the same circuit with the switch in "on" position, completing the circuit, allowing current to flow to the load, which is shown powered.

In a conventional smart home installation, the light receptacle (108) is simply replaced by a smart light (109), such as that depicted in FIG. 1C. As shown, a smart light (109) receptacle generally includes a computer (111) and a wireless transmitter (113), as well as the load (108) itself (in this case a light receptacle). The smart device (109) then contains its own independent switch (115) for operating the light, which is operated by the computer (111) in response to commands or instructions received wirelessly at the transceiver (113) from a user device or other external source.

However, this configuration has a key shortcoming. While a holistic home automation strategy may involve replacing all components in a structure, it is more common to target key areas and rooms and upgrade over time. This means that most home automation deployments have a mixture of "dumb" and "smart" lights, outlets, switches, and other components. However, smart lights do not seamlessly integrate with mechanical switches.

This is because the computer (111) and transmitter (113) require power to operate, but if the original wall switch (107) is turned off, no current flows on the live wire (103) and there is thus no power to the computer (111) and transmitter (113), and they cannot operate. This can be partially solved by simply leaving the switch (107) in "on" position and exclusively using another device to power the switch. However, when guests, children, or even forgetful homeowners leave the room, they may reflexively turn off the light switch without recalling or appreciating that this effectively disables the smart light (109). Frustrating the situation further, the removal of power for a long enough period of time can cause smart devices to reset to factory settings or lose configuration data, requiring that they be reconfigured and retested once power is restored.

This could be solved by simply disabling the physical switch entirely so that it cannot be used to control power flow. This leaves a non-functional blank faceplate on the wall, which may be confusing to guests and visitors who do not understand how to use the smart light system, and it requires all such switches to be replaced or disabled. Moreover, it is desirable to retain the functionality of the physical switch in conjunction with the smart device so that the smart device can be operated both via the home automation system and via a conventional physical switch.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a smart device comprising: an electrical switch faceplate; two or more electrical leads extending from the faceplate; the electrical leads in contact with two or more electrical connection points on a mechanical switch; the smart device providing an electrically contiguous path between the two or more electrical leads; the contiguous path ensuring that the electrical contacts in the mechanical switch which are part of the switching circuit are electrically connected regardless of the mechanical switch position; at least one current sensor disposed on the contiguous path; and a transmitter in electrical communication with the current sensor(s) and configured to receive from the current sensor(s) a measure of an amount of current on the contiguous path; wherein the transmitter receives reading from the current sensor(s) and transmits information about the state of the switching system.

In an embodiment, the smart device further comprises: a controller in electrical communication with the transmitter and the current sensor(s), the controller configured to: operate the current sensor(s) to measure current passing through the smart device; provide the measured current to the transmitter, and operate the transmitter to transmit information about the state of the mechanical switch, the state determined based upon the measured current.

In another embodiment, the transmitted information is on or off.

In another embodiment, the transmitted information is a power level.

In another embodiment, the transmitted information is that a mechanical switch in the circuit was toggled.

In another embodiment, the smart switch further comprises a power supply providing electrical power to one or more of the current sensor(s), the transmitter, and the controller.

In a further embodiment, the power supply is chosen from: an electrochemical cell, a rechargeable electrochemical cell.

In another further embodiment, the power supply comprises electronics configured to extract power from the switching circuit.

In another embodiment, the transmitter is configured to transmit the state information to a smart lighting system.

In a further embodiment, one or more elements of the smart lighting system are electrically connected to the mechanical switch.

In another embodiment, the contiguous path may be disabled using some means including but not limited to: a separate mechanical switch, relay, or a triac.

In another embodiment, the transmitter is a modular component.

In another embodiment, the transmitter is wireless.

In another embodiment, the electrical leads are configured such that when the faceplate is installed on one mechanical switch of a plurality of mechanical switches wired together in a multi-way switching configuration, the electrical leads cause the contiguous path to provide an electric circuit in the power system regardless of the toggle state of any of the plurality of mechanical switches.

In another embodiment, the multi-way switching configuration is a three-or-more-way switching configuration.

Also described herein, among other things, is a method for operating a smart lighting system with a conventional manual switch without loss of power comprising: providing an electrical circuit with a mechanical switch having a toggle; providing a smart lighting system; providing an electrical switch faceplate comprising: two or more electrical leads extending from the faceplate; a contiguous path through the faceplate for electrical current to flow between the electrical leads; one or more current sensors disposed on the contiguous path; and a transmitter in electrical communication with the current sensor(s); a controller operatively connected to the current sensor(s) and the wireless transmitter; installing the faceplate on the mechanical switch; the faceplate device forming one or more of: a bypass path around the mechanical switch, a connective path between the output terminals of the mechanical switch, a connective path between the input terminals of the mechanical switch; the controller operating the current sensor(s) to sense an amount of current on the electrical path through the faceplate; the controller converting the sensed amount of current into an indication of a state of the switch; the controller operating the transmitter to transmit the state to the smart lighting system; and the smart lighting system optionally changing state in accordance with the transmitted state.

In an embodiment of the method, the method further comprises: in the providing an electrical switch faceplate, the electrical switch faceplate further comprising a power supply providing electrical power to the current sensor(s), the transmitter, and the controller.

In a further embodiment, the power supply comprises one or more power supplies selected from the group consisting of: an electrochemical cell; a rechargeable electrochemical cell; and, an AC/DC converter configured to extract power from the electrical circuit.

In another embodiment, the mechanical switch is the only mechanical switch of the circuit.

In another embodiment, the mechanical switch is a switch in a plurality of switches wired in a multi-way switching configuration of the circuit.

In a further embodiment, the multi-way switching configuration is selected from the group consisting of: a three-way switching configuration; a four-way switching configuration; and, more than a four-way switching configuration.

Also described herein, among other things, is a smart device comprising: one electrical input with one or more physical connection points; one electrical output with one or more physical connection points; one or more user inputs chosen from a list including but not limited to: mechanical switch input(s), capacitive touch, resistive force; a contiguous path through the smart device connecting the electrical input with the electrical output; and a wireless transmitter in electrical connection with the one or more user inputs.

In an embodiment of the smart device, the smart device further comprises: a controller in electrical communication with the transmitter and the user inputs, the controller configured to: provide the user inputs to the transmitter; and operate the transmitter to transmit a state of the user inputs.

In a further embodiment, the device further comprises a power supply providing electrical power to one or more of the current sensor(s), the transmitter, and the controller.

In another embodiment, the contiguous path may be disabled using some means including but not limited to: a separate mechanical switch, relay, or a triac.

In another embodiment, one or more current sensors are included in the device.

In another embodiment, a current sensor is installed between the input and output for informational purposes including but not limited to: current being drawn through the circuit; and instantaneous loss of current flow caused by other mechanical switches in the circuit changing positions.

In another embodiment, a current sensor is installed electrically between one or more of: the physical connection points on the output of the device; the physical connection point on the input of the device.

In another embodiment, changes in the value of the current flowing through one or more of the current sensors provides information about the state of other mechanical switches in the overall circuit and the transmitter sends that information to a smart lighting system.

In another embodiment, the transmitter is a modular component.

DESCRIPTION OF THE PREFERRED EMBODIMENT(S)

Figure 1A:
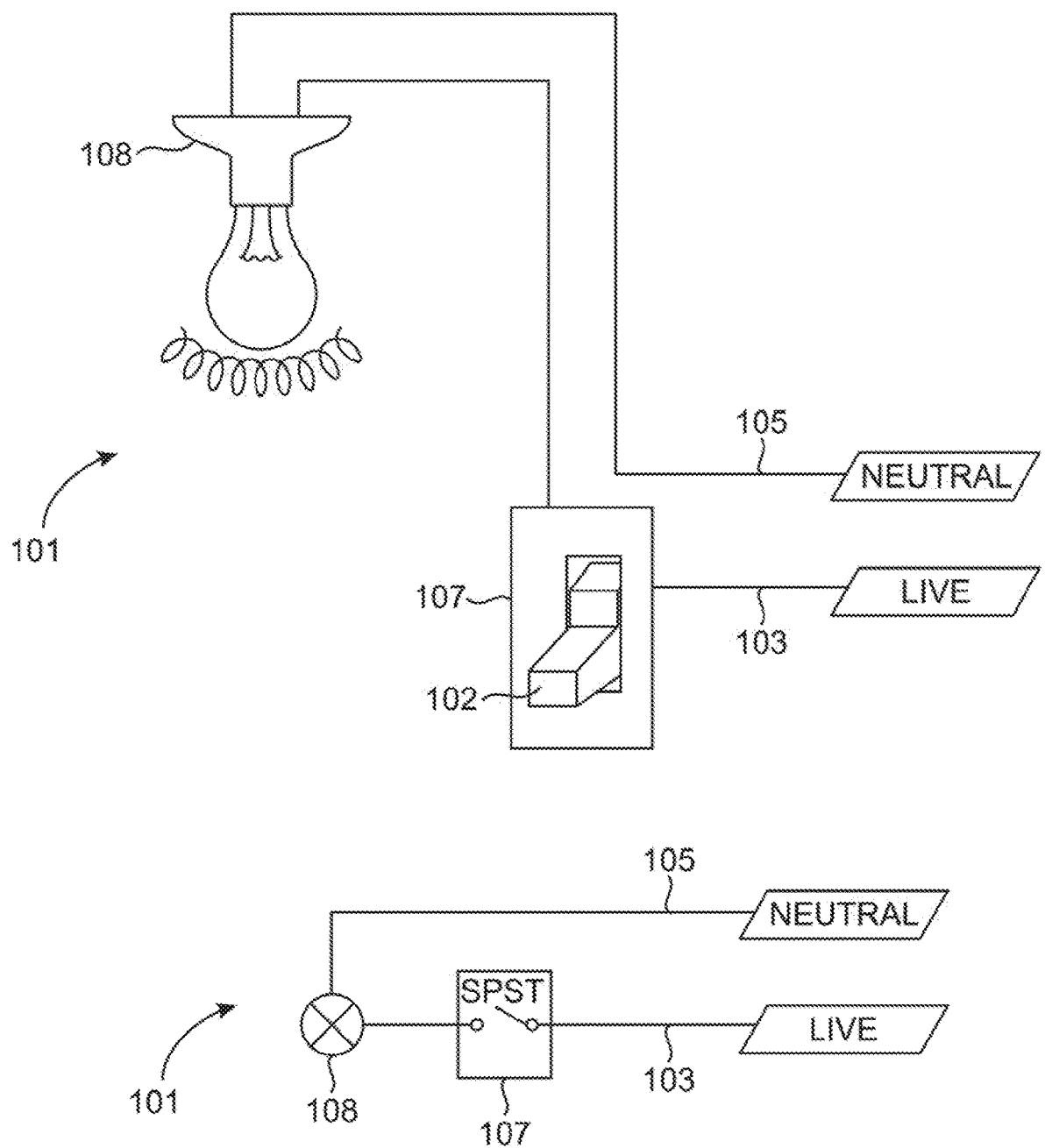
FIGS. 1A-1C depict a prior art conversion of a conventional light to a smart light.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wristwear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described herein are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "embedded system," "embedded computer," and variants thereof distinguish special purpose computer hardware and software from general-purpose computer hardware and software. As used herein, an embedded system is a special-purpose system in which the computer is mostly or completely encapsulated by the device it controls. Unlike a general-purpose computer, such as a personal computer, an embedded system generally performs more limited, pre-defined tasks, usually with very specific requirements to accomplish a limited and pre-defined set of operational tasks. Since the system is dedicated to a specific task, it is more easily optimized for the task, reducing size and cost by eliminating unnecessary components found in general-purpose computers, and designing board circuitry and system geometry to improve operational efficiency, reduce manufacturing cost, and address operation-specific conditions, such as temperature extremes.

Throughout this disclosure, the term "mechanical switch" or "physical switch" refers to an electrical switch structure operable to an "on" or "off" position, in which the "on" position "makes" a circuit by providing a complete electrical path through the device, and the "off" position "breaks" the circuit by interrupting or diverting current flow. This is typically done by introducing a physical break in the path of sufficient width to form an insulating air gap. The term "contacts" refers to the physical components of the switch which create or remove this gap, such as the poles and throws in a conventional light switch. By contrast, the term "toggle" refers to a component of the switch that is (usually) electrically insulated from the current flow and physically manipulated to make or break the circuit. In a conventional dwelling, the toggle is the part colloquially referred to as the "light switch" and move up or down to turn lights on or off, but should be understood in the context of this disclosure as meaning any human-operable means for a user to place the contacts in the desired on/off state.

Throughout this disclosure, a "toggle event" means the changing of the position of a toggle from a first position to a second position. A person of ordinary skill in the art will appreciate that while toggles typically have only two functional positions, it is known in the art to have a multi-position toggle settable to three or more positions. Description is provided herein using the illustrative embodiment of a binary toggle, but a person of ordinary skill in the art will understand that the teachings of this disclosure may be easily adapted to implement the invention in a three-position toggle or more.

Described herein are devices, systems, and methods for modifying an existing electrical circuit to enable a physical switch to seamlessly integrate with smart lights and other smart devices such that the smart device is operable both via the physical switch and via a home automation system, without loss of power to the smart device computer and transmitter components caused by use of the wall switch.

This is done through a combination of features. First, described herein is a replacement switch or faceplate which effectively bypasses or shorts the physical switch so that current is always flowing through the switch device regardless of the position of the toggle. By detecting whether current is flowing across the short, the toggle position may be inferred and a change in toggle position may be communicated to the smart device, either directly or via a central controller or home automation functionality. The smart device may then take whatever steps would ordinarily be taken in response to a toggle event.

Figure 1B:
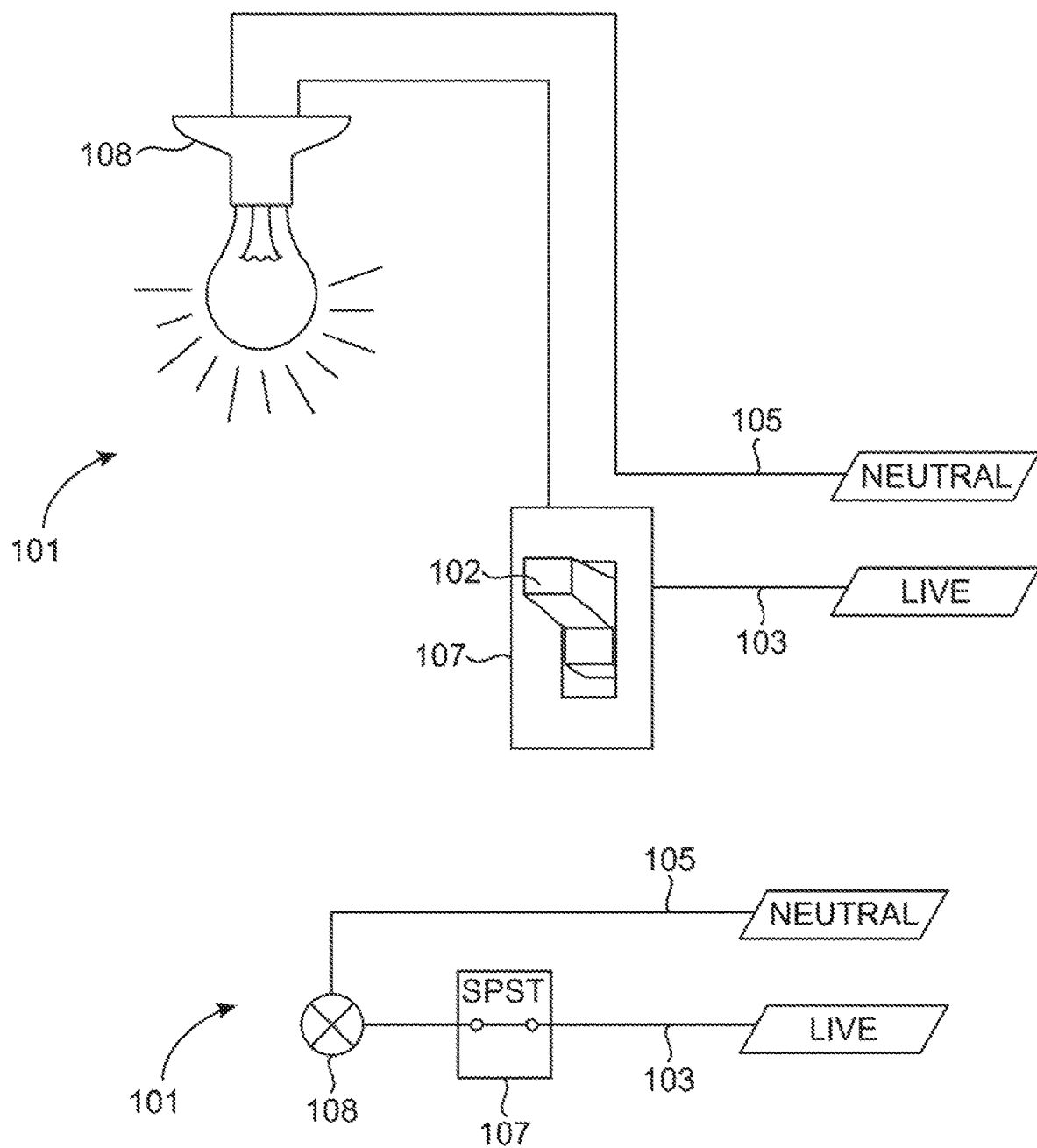
Figure 1C:
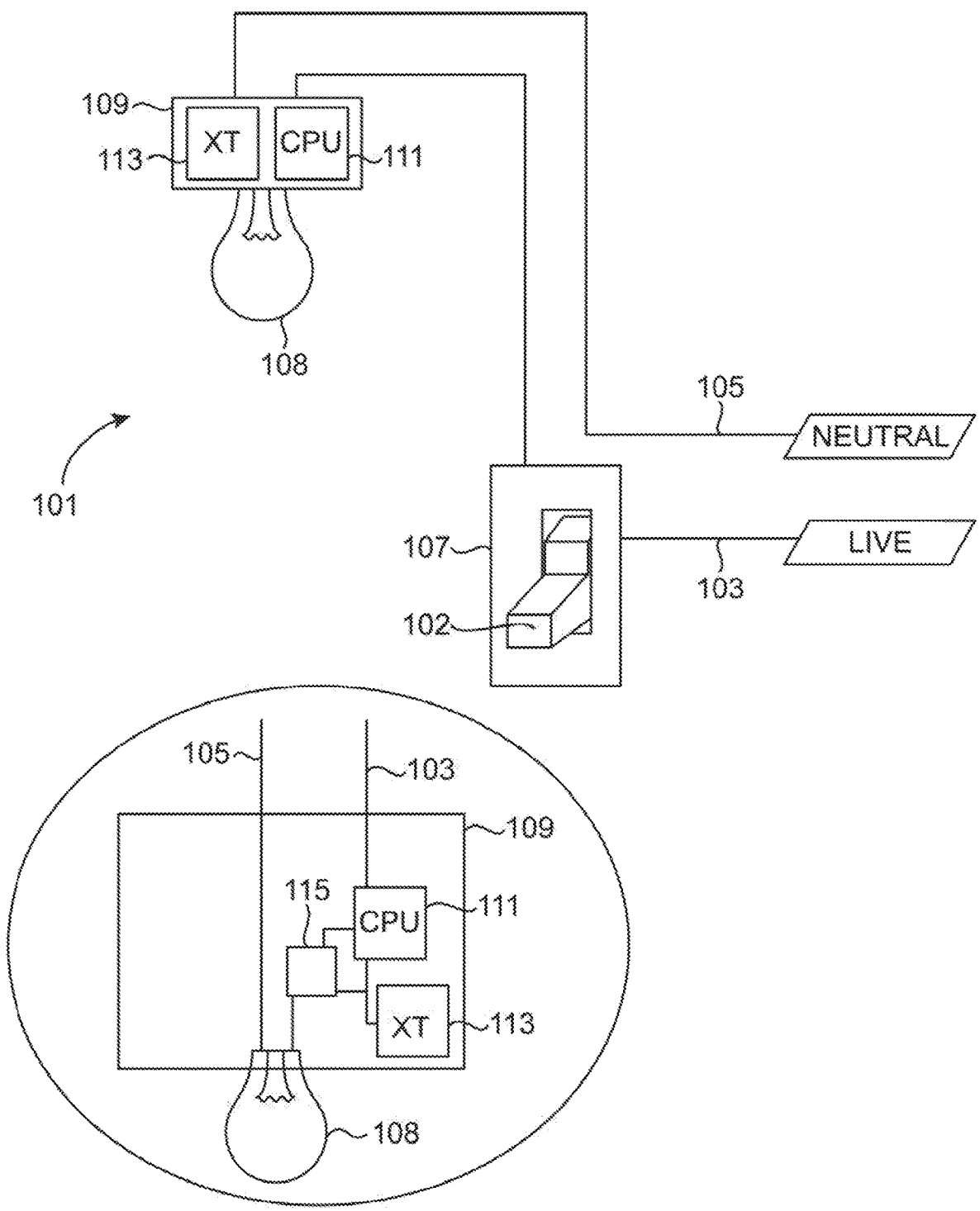
Figure 2A:
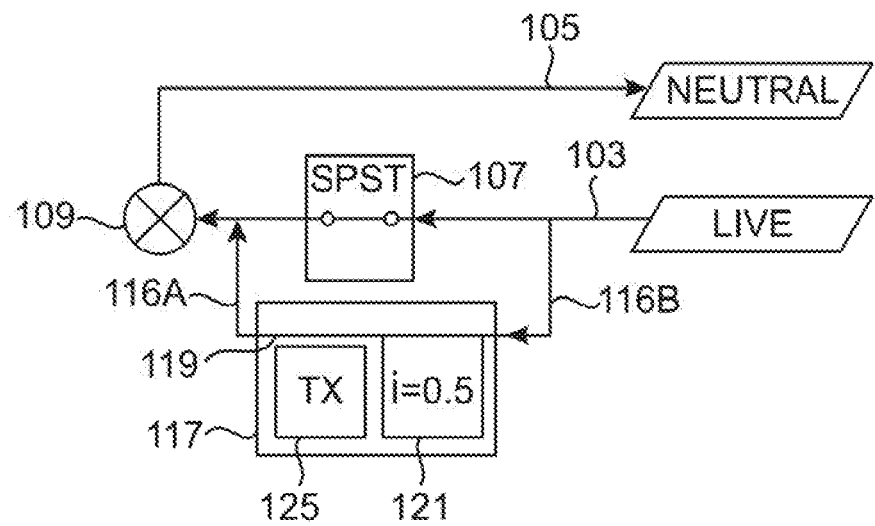
FIGS. 2A-2B depict an embodiment of a faceplate according to the present disclosure in a SPST switch.
Figure 2B:
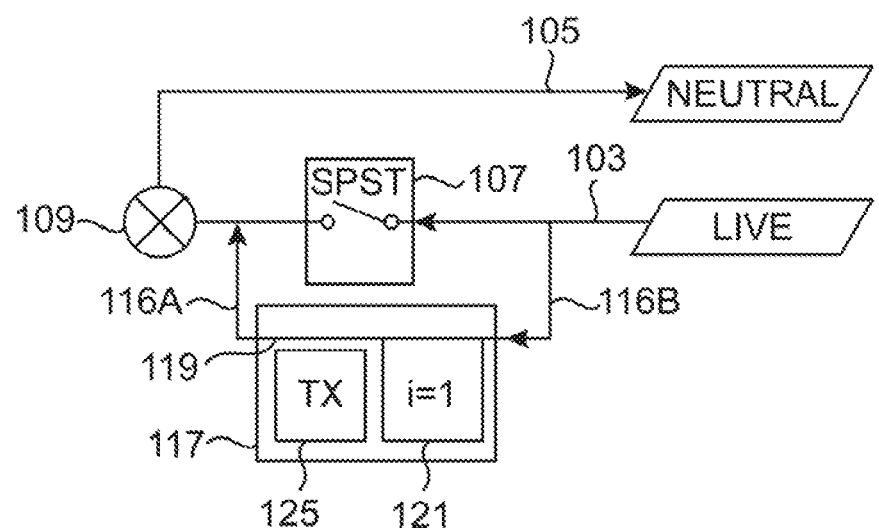

An exemplary embodiment of such a device is depicted in FIGS. 2A and 2B. In the depicted embodiment, a conventional wall switch (107) is wired into a light circuit (101) similar to that depicted in prior art FIGS. 1A, 1B, and 1C. However, in the depicted embodiments of FIGS. 2A and 2B, a faceplate (117) according to the present disclosure is installed on the switch (107). The depicted faceplate (117) comprises a path (119) for continuous electrical current passing through the faceplate (117) from a first lead (116A) to a second lead (116B). The path (119) is also in electric communication with a current sensor (121) disposed on or within the faceplate (117). The faceplate (117) is installed to the switch (107) in the manner of a conventional faceplate, but the size, shape, length, and placement of the leads (116A) and (116B) is such that when the faceplate is installed, one of the leads (116B) is in electrical communication with the live wire from the power source, and the other lead (116A) is in electrical communication with the corresponding hot wire downstream from the switch (107). This has the effect of creating an alternative electrical path which bypasses the contacts in the switch (107). Thus, regardless of the state of the contacts (open or closed), electrical current flows on the live wire (103) to power the load (108).

Additionally, in the depicted embodiment, the current sensor (121) also has continual access to power and senses current on the path (119). The current sensor may also participate in inferring the state of the contacts. If the contacts are closed, as in FIG. 2A, then there are two electrical paths in parallel—one through the switch (107) and one through the faceplate (117). Because the total current is the same whether the contacts are opened or closed, when the contacts are closed and there are two paths, only part of the current is on the bypass path (119) and the amount of current is lower than when the contacts are open as in FIG. 2B and all of the current is on the path (119). Because the state of the contacts is based upon the corresponding position of the toggle, the toggle state (on or off) may be inferred from the current as detected by the current sensor (121). For example, in the depicted embodiment of FIG. 2B, full current ("I") is detected, reflecting an open contact and an "off" position of the toggle. However, in the depicted embodiment of FIG. 2A, half current ("0.5") is detected, reflecting a closed contact and an "on" position of the toggle.

In an embodiment, the faceplate (117) may further comprise a transceiver adapted or configured to receive the toggle state as inferred by the current sensor (121) and to transmit that toggle state. This transmission may be directly to the corresponding smart light (109) or to a central controller or other computer system where the information may be processed and acted upon in the ordinary course. A person of ordinary skill in the art will readily appreciate that these components imply the presence of other components in the faceplate (117), such as wires connecting the transceiver to the current sensor and a controller, microcomputer, or embedded system configured with the appropriate program logic. Power conversion components may also be needed, which may in turn require additional wiring, such as a lead to the neutral wire. In an embodiment, the faceplate (117) may further comprise an independent power source, fuse or other surge protection means and/or a secondary toggle capability adapted to disable the bypass circuit.

As can be seen in the FIGS., this enables the seamless integration of the mechanical switch (107) with the smart device (109). When the toggle (102) is operated, the contacts in the switch (107) are likewise operated, resulting in a change to the amount of current on the bypass path (119), which in turn is detected by the current sensor (121). This state may be transmitted on a continuous or periodic basis, or may be monitored for change from a prior recorded state and transmitted only if a change from such prior recorded state is detected. This logic may be carried out by an on-board controller or embedded system in the faceplate (117). The smart light (109) may directly or indirectly receive this indication and then operate the switch (115) in the smart light to power the load (108). If the toggle is operated again, the process repeats, allowing the "dumb" mechanical switch to operate the smart light (109). Simultaneously, the home automation system can also operate the smart light (109) independently because power is supplied to the smart light (109) regardless of the toggle (102) or switch (107) state.

Figure 3:
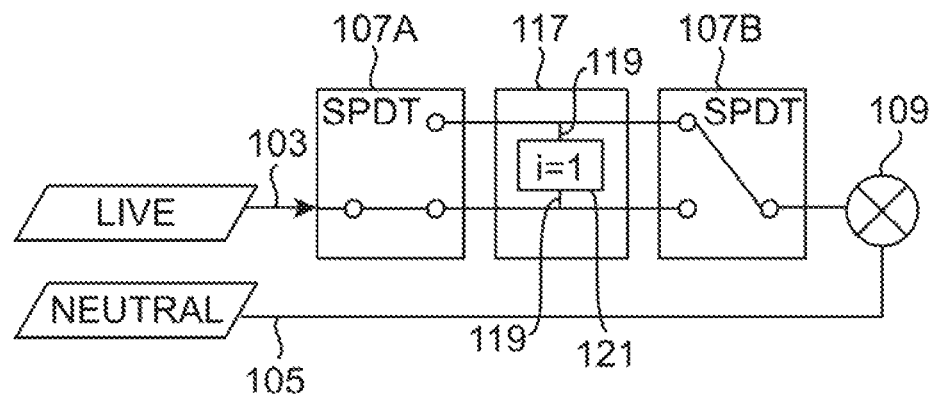
FIG. 3 depicts an embodiment of a faceplate according to the present disclosure in a 3-way switch.
Figure 4:
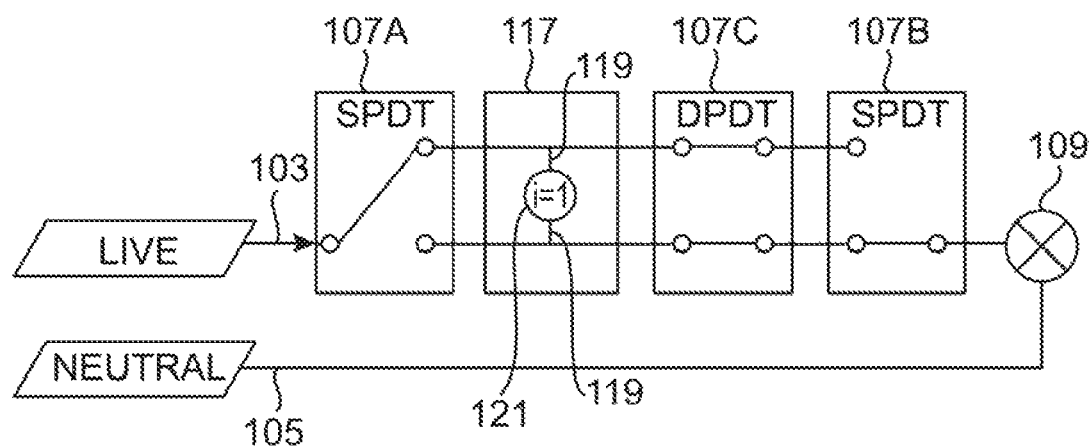
FIG. 4 depicts an embodiment of a faceplate according to the present disclosure in a four way switch.

FIG. 3 depicts an exemplary embodiment of a faceplate (117) according to the present disclosure configured for use in a 3-way switch wiring geometry. As will be understood by a person of ordinary skill in the art, multi-way wiring geometries are used to cause each switch to operate as an independent toggle. The circuit has two states—"on" (powered) and "off" (unpowered)—and operating any one of the switches causes the circuit to change to the opposite state—unpowered circuits receive power and turn on, and powered circuits turn off. For example, in a 3-way switch (involving two independent switches), an additional wire is required so that the power state toggles regardless of which of the two switches is operated, and regardless of the state of the other switch. This is essentially done by wiring the two switches together with an additional wire so that any time one of the switches changes state, the circuit also changes state.

The depicted faceplate (117) is effectively inserted into the circuit to replace or supplement this additional wire. As shown in FIG. 3, the 3-way faceplate has two inputs from the first switch (107A) which pass through the faceplate and exit to connect to the conventional corresponding inputs on the second switch (107B). However, within the faceplate (117), these two separate paths are "shorted" via a bypass (119) that causes power to pass through the circuit regardless of the state of either of the switches (107A) and (107B). Again, the bypass path (119) is associated with a current sensor (121) which detects changes in current and infers the overall toggle state as described elsewhere herein. In the 3-way geometry, a change to either switch (107A) or (107B) will also toggle the load on the path (119), either from powered to unpowered in this instance. When the path (119) is unpowered, it may be inferred that power flows through the system elsewhere (either through the top and bottom through-lines in the faceplate (117)), meaning the inferred toggle state is "powered" or "on." However, if the path is powered, it means there is no path elsewhere, and the inferred powered state is "off." This information may be detected, stored, transmitted, and otherwise processed as described elsewhere herein, including by use of a transmitter and other components described and depicted elsewhere.

Similarly, for a 4-way or more wiring geometry, the same faceplate (117) as in FIG. 3 can be used, the only difference being the addition of a third switch (107C). As can be seen, the edge switches (107A) and (107B) are single-pole, double-throw switches as in FIG. 3, and the additional third switch is a double-pole, double-throw switch, as would be understood by a person of ordinary skill to implement a 4-way switch. Any change to the toggle state of any of the three switches will result in continuous power flow via a faceplate (117) as described elsewhere herein.

A person of ordinary skill in the art will immediately appreciate that the components associated with the faceplate may require a power supply or power source. This may be done in a number of ways. One, power may be provided via an electrochemical cell in the faceplate (117). This has the advantage of maintaining a separate power supply for the faceplate (117) components, which reduces manufacturing and design costs and is a proven technique used in various "Internet of Things" (IoT) devices.

Figure 5:
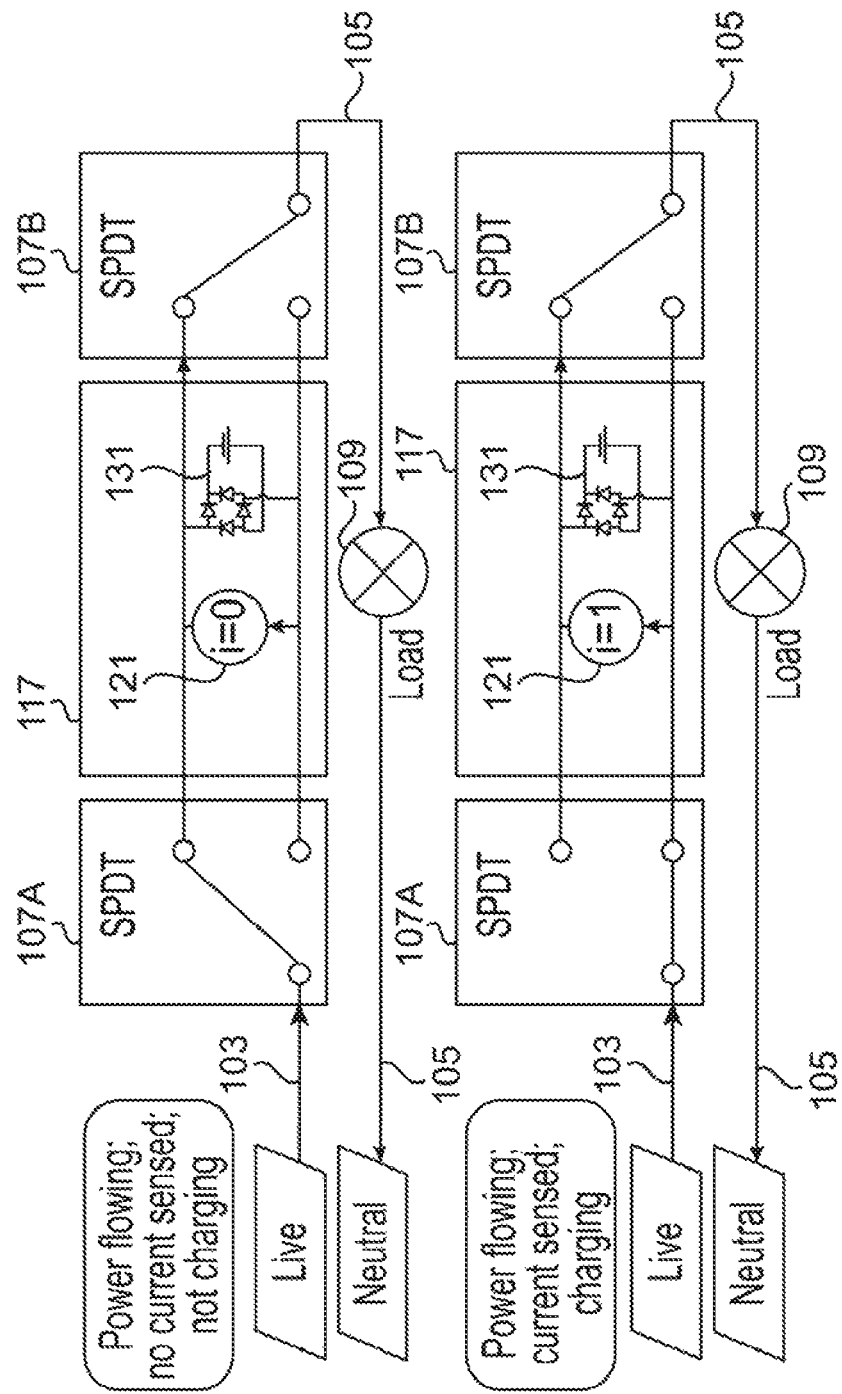
FIG. 5 depicts an embodiment of a faceplate according to the present disclosure using a battery charger.
Figure 6:
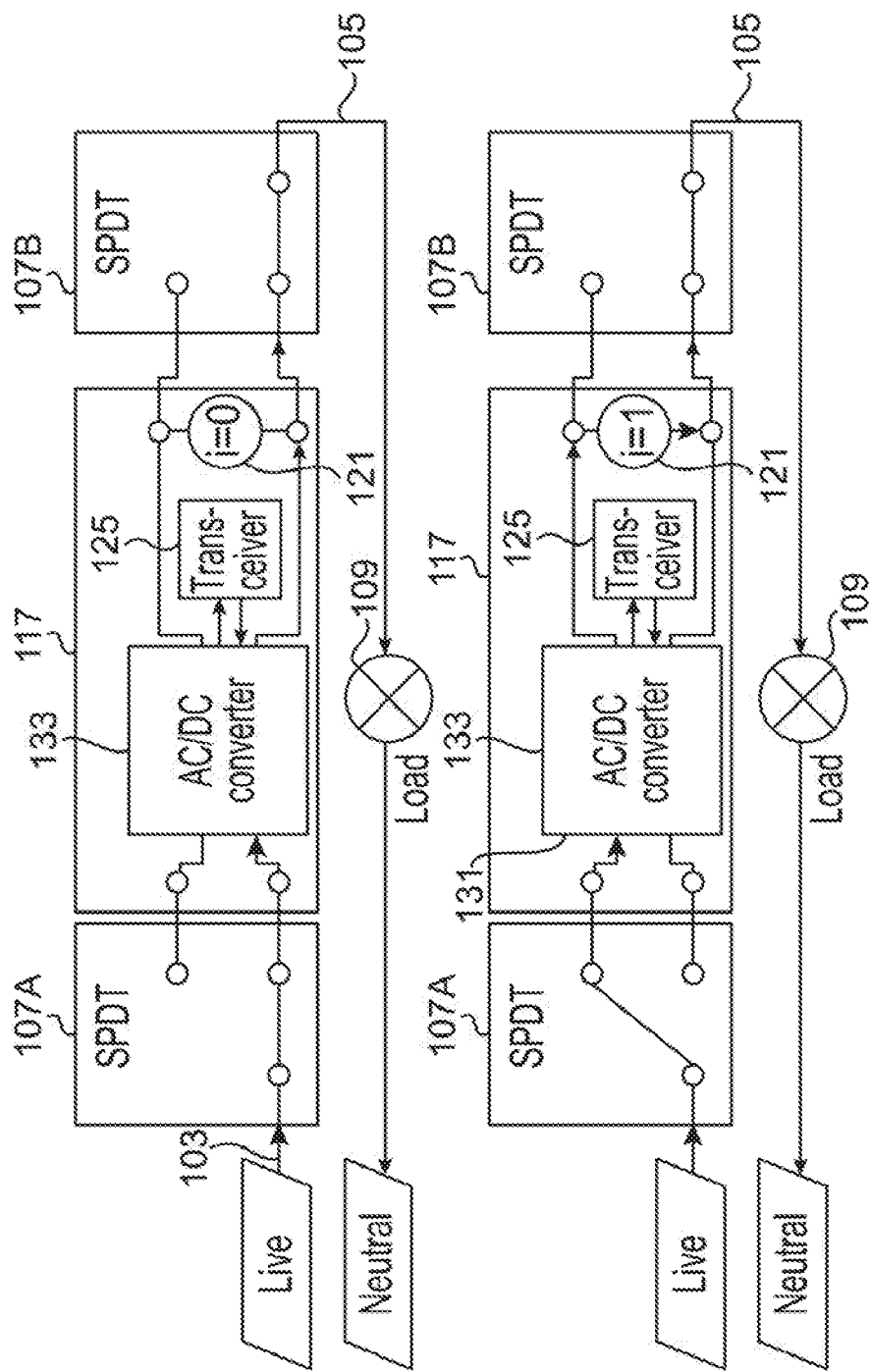
FIG. 6 depicts an embodiment of a faceplate according to the present disclosure using an enhanced power supply.

Another option, shown in FIG. 5, is to power the components using a battery 131 or capacitor 131 which is charged when current is flowing through the faceplate (117). Known charging technologies have sufficiently long operational lives between charging sessions for most typical applications and would be expected to be suitable for use in most dwellings, particularly in bedrooms, kitchens, and other high-traffic areas where lights are operated frequently. A still further option is to use the power on the live wire connected to the faceplate (117), either directly or via inductive charging. This may require further components, such as an AC/DC converter 133 which may include a parallel pass-through, and may involve a somewhat more complex installation, but would have the advantage of continuous or near-continuous power availability, allowing the transmitter and other components to operate more on a continuous basis.

Further describing the power supply concept depicted in FIG. 5, the diode protected power supply could accept power passing through it in either configuration. Internally, the power supply element may be wired in parallel, and may utilize a minimal amount of power through the system. In such a configuration, the user preferably disconnects the wires from the switch, attaches them to the invention and then attaches the invention to the switch. This would facilitate robust operation because the system would always be powered. Using such a power supply could provide a continuous or nearly continuous source of power, allowing the included transmitter/transceiver to operate on a more continuous basis.

Additional modifications may include the ability to selectively disconnect the bypass feature, which would cause power to disconnect from the load. This may be desirable, for example, when servicing or changing the device. Alternatively, power should be disabled at the circuit breaker for safe removal.

Installation could be performed with or without wiring and only one device need be added to the circuit to realize the benefits of the present disclosure. The system is inherently compatible with 2-way, 3-way, 4-way, or more-way switching configurations and facilitates improved user experiences with smart devices as well as integrating conventional toggle-based interactions with smart devices.

The systems and methods described herein are not limited to only toggling interactions with mechanical switches, but may alternatively and/or additionally include dimming functionality. In an embodiment, such functionality may be relayed by the transmitter based on measurements of current taken on the device. Such a measurement may be used to determine, calculate, or infer a dimming state. By way of example and not limitation, a conventional dimming circuit is modified by creating a bypass around the dimmer components while maintaining an electrically contiguous circuit. This may result in current flow through the bypass, reducing or eliminating current flow through the conventional dimming circuit. In such a case, full current would flow through the bypass circuit when the dimmer is set to its dimmest level. As the brightness setting is increased, the amount of current flowing through the bypass decreases. Software may be used to detect, determine, or learn a relationship between the amount of detected current and the dimmer setting. This relationship may be determined as needed and may vary from implementation to implementation, depending on the configuration, properties, and needs of each system. In practice, such a system may account for the current measurement being affected by both the dimming circuit and changes to the load.

Generally, the invention is used to facilitate an electrically continuous path to the load regardless of mechanical switch position. This may be achieved by bridging the outputs of a given switch together electrically. In the case of a SPST mechanical switch or dimmer, an electrical connection between the input and output may be formed to ensure proper functionality. Generally, multiway mechanical switches exist in SPDT or DPDT configurations. For such systems, two leads may be used to form an electrical path, bridging one of the sides with two electrical connection points. As would be obvious, one could use more electrical connection points to form electrical paths, up to and including electrically connecting all of the mechanically switched connection points through the invention.

The system and methods described herein may be in addition to a traditional mechanical switch, but also could be extended by replacing the mechanical switch completely with a device which generally performs the same function. This replacement device may electrically connect all input and output points originally connected with a mechanical switch, may optionally draw power from the completed circuit, and may provide different user input options than a conventional mechanical switch. Such a replacement device may optionally comprise modular transmitter for interoperability with a variety of different smart devices from different manufacturers. This may also provide a contiguous electrical path for the load, monitoring of other mechanical switch operation in the switching circuit, and more options for user input into a given smart device system.

Such a replacement device would be advantageous compared to a traditional smart switch in that the electronics would be simplified (e.g., not switching AC loads), installation could take place within existing multiway installations, and installations would not require a neutral wire. Such a replacement device may be made significantly cheaper to manufacture than a smart switch, while providing many of the benefits of a typical smart switch. Such a replacement device uses a smart end load to receive commands from the transmitter, and reduces issues caused when a typical mechanical switch removes power from a smart device. In an embodiment, the replacement device may have a disconnect, through mechanical switch, relay, or triac, which need not handle the cycle count typically associated with a switching system, as such a disconnect would be used when replacing components attached to the circuit. If such a disconnect is not included, power to the circuit may be removed via a circuit breaker or fuse, as would be expected under typical circumstances.

The various embodiments and methods described herein address the need for smart loads to have constant power to remain "smart." Throughout this disclosure, the terms "smart light," "smart lighting system," and the like are used but these are illustrative only and the system and methods described herein are suitable for use with any smart device, which generally will be understood to be any electrical load which includes some control method to handle the functionality of that device. For example, smart lights can typically power on, power off, and dim in accordance with commands sent to the controller. Many smart lights make up a smart lighting system, which may be spread across more than one electrical wiring circuit. Additional smart loads may include, but are not limited to, smart appliances, smart heaters, and smart fans, all of which may be enhanced described herein. While the present disclosure typically would be used to control an electrically connected smart load nothing prevents signals transmitted by the device from performing any function programmed into one or more smart devices which receive that transmission.

While the invention has been disclosed in conjunction with a description of certain embodiments, including those that are currently believed to be preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A smart device comprising:
   a faceplate adapted for installation on a mechanical switch, said mechanical switch wired to a power system and alternatively opening and closing a first connection from a power source to a load;
   a first electrical lead extending from said faceplate;
   a second electrical lead extending from said faceplate;
   a contiguous path through said faceplate for electrical current to flow through said faceplate from said first electrical lead to said second electrical lead;
   a current sensor disposed on said contiguous path; and
   a wireless transmitter in electrical communication with said current sensor and configured to receive from said current sensor a measure of an amount of current on said contiguous path;
   wherein when said faceplate is installed on said mechanical switch said contagious path provides a second connection from said power source to said load via said first electrical lead and said second electrical lead.

2. The smart device of claim 1, further comprising:
   a controller in electrical communication with said transmitter and said current sensor, said controller configured to:
   operate said current sensor to measure current on said contiguous path;
   provide said measured current to said transmitter; and
   operate said transmitter to transmit information about the state of said mechanical switch, said state determined based upon said measured current.

3. The smart device of claim 2, wherein said transmitted information is whether the state of said mechanical switch is open or closed.

4. The smart device of claim 2, wherein said transmitted information is said measured current.

5. The smart device of claim 2, wherein said transmitted information is that said mechanical switch was toggled.

6. The smart device of claim 2, wherein said smart device further comprises a power supply providing electrical power to one or more of said current sensor, said transmitter, and said controller.

7. The smart device of claim 6, wherein said power supply is selected from the group consisting of: an electrochemical cell, a rechargeable electrochemical cell.

8. The smart device of claim 6, wherein said power supply comprises electronics configured to extract power from said power system.

9. The smart device of claim 1, wherein said transmitter is configured to transmit said information about said state of said mechanical switch.

10. The smart device of claim 1, further comprising a means for disabling said contiguous path.

11. The smart device of claim 10, wherein said means for disabling said contiguous path is selected from the group consisting of: a second mechanical switch, a relay, and a triac.

12. The smart device of claim 1, wherein said transmitter is a modular component.

13. The smart device of claim 1, wherein said first electrical lead and said second electrical lead are configured such that when said faceplate is installed on a first mechanical switch of a plurality of mechanical switches wired together in a multi-way switching configuration, said first electrical lead and said second electrical lead cause said contiguous path to provide an electric circuit in said power system regardless of the toggle state of any of said plurality of mechanical switches.

14. The smart device of claim 13, wherein said multi-way switching configuration is a three-or-more-way switching configuration.

15. A method for operating a smart light with a conventional manual switch without loss of power comprising:
   providing a light receptacle installed in a circuit including a mechanical switch having a toggle, said mechanical switch wired to a power system and said toggle toggling opening and closing a first connection from a power source to said light receptacle;
   providing a smart light installed in said light receptacle;
   providing an electrical switch faceplate comprising:
   a first electrical lead extending from said faceplate;
   a second electrical lead extending from said faceplate;
   a contiguous path providing a second connection through said faceplate for electrical current to flow through said faceplate from said first electrical lead to said second electrical lead;
   a current sensor disposed on said contiguous path;
   a wireless transmitter in electrical communication with said current sensor; and
   a controller operatively connected to said current sensor and said wireless transmitter;
   installing said faceplate on said mechanical switch so that said first electrical lead and said second electrical lead form said second connection around said mechanical switch via said contiguous path;
   said controller operating said current sensor to sense an amount of current on said contiguous path;
   said controller converting said sensed amount of current into an indication of a detected state of said toggle;
   said controller operating said transmitter to transmit said detected state to said smart light; and
   said smart light turning on or off in accordance with said transmitted detected state.

16. The method of claim 15 further comprising:
   in said providing an electrical switch faceplate, said electrical switch faceplate further comprising a power supply providing electrical power to said current sensor, said transmitter, and said controller.

17. The method of claim 16, wherein said power supply comprises one or more power supplies selected from the group consisting of: an electrochemical cell; a rechargeable electrochemical cell; and, an AC/DC converter adapted to convert AC power in said circuit to DC power for said current sensor, said transmitter, and said controller.

18. The method of claim 15, wherein said mechanical switch is the only mechanical switch of said circuit.

19. The method of claim 15, wherein said mechanical switch is a first switch in a plurality of switches wired in a multi-way switching configuration of said circuit.

20. The method of claim 19, wherein said multi-way switching configuration is selected from the group consisting of: a three-way switching configuration: a four-way switching configuration; and, more than a four-way switching configuration.

21. A smart lighting system comprising:
   a smart light installed in a lighting receptacle;
   a mechanical switch wired to a power system and alternatively opening and closing a first connection from a power source to said smart light;
   a faceplate installed on a mechanical switch, said faceplate comprising:
   a first electrical lead extending from said faceplate;
   a second electrical lead extending from said faceplate;
   a contiguous path providing a second connection through said faceplate for electrical current to flow through said faceplate from said first electrical lead to said second electrical lead;
a current sensor disposed on said contiguous path; and
a wireless transmitter in electrical communication with said current sensor and configured to receive from said current sensor a measure of an amount of current on said contiguous path;
wherein said contiguous path connects said power source to said smart light via said first electrical lead and said second electrical lead.

22. The system of claim 21, farther comprising:
a controller in electrical communication with said transmitter and said current sensor, said controller configured to:
operate said current sensor to measure current on said contiguous path;
provide said measured current to said transmitter; and
operate said transmitter to transmit information about the state of said mechanical switch, said state determined based upon said measured current.

23. The system of claim 21 further comprising a power supply providing electrical power to one or more of said transmitter and said controller.

24. The system of claim 21, further comprising a means for disabling said contiguous path, said means selected from the group consisting of: a separate mechanical switch, a relay, and a triac.

25. The system of claim 21, wherein said transmitter is a modular component.

* * * * *